United States Patent
Radhakrishnan

(10) Patent No.: US 7,143,420 B2
(45) Date of Patent: Nov. 28, 2006

(54) STRATEGIC TECHNOLOGY ARCHITECTURE ROADMAP

(75) Inventor: Rakesh Radhakrishnan, Ashburn, VA (US)

(73) Assignee: Sun Microsystems, Inc., Santa Clara, CA (US)

( * ) Notice: Subject to any disclaimer, the term of this patent is extended or adjusted under 35 U.S.C. 154(b) by 777 days.

(21) Appl. No.: 10/230,591

(22) Filed: Aug. 29, 2002

(65) Prior Publication Data

US 2004/0045014 A1 Mar. 4, 2004

(51) Int. Cl.
*G06F 9/44* (2006.01)

(52) U.S. Cl. ............ 719/328; 717/104; 709/203; 709/223

(58) Field of Classification Search .......... 719/310, 719/313–316, 320, 328; 717/100–104; 709/203, 709/223
See application file for complete search history.

(56) References Cited

U.S. PATENT DOCUMENTS

| | | | | |
|---|---|---|---|---|
| 6,085,238 A * | 7/2000 | Yuasa et al. | ............... | 709/223 |
| 6,134,594 A * | 10/2000 | Helland et al. | ............. | 709/229 |
| 6,377,993 B1 * | 4/2002 | Brandt et al. | ............... | 709/227 |
| 6,424,991 B1 * | 7/2002 | Gish | ......................... | 709/203 |
| 6,690,783 B1 * | 2/2004 | Creamer et al. | ........ | 379/201.12 |
| 6,968,535 B1 * | 11/2005 | Stelting et al. | ............. | 717/104 |
| 2002/0103889 A1 * | 8/2002 | Markson et al. | ............ | 709/223 |
| 2003/0009606 A1 * | 1/2003 | Muthukannan | ............. | 709/328 |
| 2003/0172145 A1 * | 9/2003 | Nguyen | ..................... | 709/223 |

OTHER PUBLICATIONS

Guthrie, Cathy and Data Center and High Performance Group, The Benefits of Consolidation, Sun Journal, Industry Trends, Sep. 4, 2002, pp. 1-5.
Dr. James B. Baty, Towards a Services-Oriented Architecture, Sun Journal, Sep. 4, 2002, pp. 1-3.

* cited by examiner

*Primary Examiner*—William Thomson
*Assistant Examiner*—Van Nguyen
(74) *Attorney, Agent, or Firm*—Kent A. Lembke; William J. Kubida; Hogan & Hartson LLP

(57) ABSTRACT

The preferred embodiments relate to a system and method for creating an end-to-end e-business system for an enterprise. In some embodiments, a strategic architecture roadmap includes: a) an upper infrastructure layer having a service-driven architecture, with a virtual application layer having a distributed component architecture, and with a an application infrastructure layer having an n-tiered architecture; and b) a lower infrastructure layer having a network-centric architecture, with a compute server infrastructure layer having an adaptive compute architecture, and with a data storage infrastructure layer having a storage network architecture.

30 Claims, 13 Drawing Sheets

STRATEGIC TECHNOLOGY ARCHITECTURE ROADMAP

FIELD OF THE INVENTION

The present invention relates generally to architectures in enterprises, such as, e.g., networks, systems, application infrastructures and functional applications, and, in some particular embodiments, to methods for establishing enhanced e-commerce systems.

INTRODUCTION

Despite a widely-publicized slow-down in the exponential growth of the Internet and e-commerce related systems, new systems continue to be developed, introduced and/or modified each and every day. Numerous e-commerce systems are being developed and/or implemented for use on the Internet, the Web, or another network for various entities. Today, increased numbers of developers seek to create distributed transactional applications for enterprises and to leverage speed, security, and reliability of server-side technology. In today's fast-paced and demanding world of e-commerce, enterprise applications should be designed, built, and produced for less money, with greater speed, and with less resources than ever before.

To help reduce costs and increase enterprise application design and development, the Sun Microsystems™ Java™ 2 Platform, Enterprise Edition (J2EE™) technology, as one example, provides a component-based approach to the design, development, assembly, and deployment of enterprise applications. The J2EE platform provides a multi-tiered distributed application model, the ability to reuse components, an integrated Extensible Markup Language (XML)-based data interchange, a unified security model, and a flexible transaction control. As a result, developers can deliver new customer solutions faster. Additionally, platform-independent J2EE component-based solutions are not tied to the products and application programming interfaces (APIs) of any one vendor. Vendors and customers can receive a freedom to choose the products and components that best meet their business and technological requirements.

A typical J2EE application runs the servlets and JSP components on the web server. Many such components could be cached by the web proxy server. EJB components are served by the application server. SQLJ-or-Java/Stored Procedure (embedded SQL statements in Java) components are running on the database DB servers. Authentication/authorization components are running on an LDAP (Lightweight Directory Access Protocol) server and the J2EE components are signed and certified by the certificate server. If an XML (Extensible Markup Language) based inter application integration is used, then these XML components are run on EAI (enterprise application integration) or B2B (business to business) application integration servers (like Web methods). Using JMS if synchronous transactions are executed by the application, then a messaging server can be used (such as, for example, TIBCO). Similarly, if synchronous application transaction is run, then a transaction server can be used (such as, e.g., TUXEDO). Each application infrastructure vendor extends support to J2EE™ by adhering to its specifications. The basic infrastructure services that make up a typical dot.com environment with their respective J2EE™ technology security components may include, for example, one or more of the following: directory server (e.g., JAAS); proxy server (e.g., JSSE); portal server (e.g., JSSE/JAAS); web server (e.g., JSSE/JCE); application server (e.g., JSM/JAC); messaging server (e.g., JMD/JDS); transaction server (e.g., JMD/JDS); certificate server (e.g., JCE); and/or CORBA server (e.g., CSSS).

In various circumstances, not all dot.com environments are expected to have implementations of all these basic services. In some circumstances, some or all of the following services, e.g., can be combined: directory server—Java authentication & authorization service; proxy server—protocol tunneling and reverse proxies; mail server—mail proxy and SSL (Secure Socket Layer); web server—web proxy and SSL; application server—protection domains and deployment descriptors; transaction server—streaming transactions over SSL and integrity validation/verification; messaging server—passing of digital certificates and signed/encrypted messages; and/or certificate server—mutual identity verification/validation and digital certificates.

SUMMARY OF THE PREFERRED EMBODIMENTS

The preferred embodiments of the present invention provide substantial advantages over existing systems and methods.

The preferred embodiments of the present invention provide a "Strategic Technology Architecture Roadmap" (STAR), which can provide an end-to-end framework for all or all or substantially all the technologies in an enterprise, including those used by its trading partners and external customers. In most preferred embodiments, this "roadmap" applies to essentially all of the technologies in an enterprise and the STAR framework encompasses and ties together the various architectures in an enterprise—such as, e.g., networks, systems, application infrastructures (such as, e.g., databases and directories), and functional applications—toward a preferred goal of transforming it into a true e-business.

Application architectures (such as, in preferred examples, those based on J2EE™ technology) drive the application infrastructure architecture (Web servers, application servers, database servers, messaging servers, media servers and so on). In turn, the application infrastructure required to run, for instance, a J2EE technology-based application dictates the network architecture and the selection and design of the compute resources and data storage platform. The application infrastructure can be analogized as the "glue" that binds itself with the rest of the infrastructure to offer to it's users what are referred to as "systemic qualities."

According to one illustrative embodiment, a computer system having aligned architectures and infrastructure for e-commerce technologies of an enterprise includes: a) an upper infrastructure layer having a service-driven architecture, with a virtual application layer having a distributed component architecture, and with an application infrastructure layer having an n-tiered architecture; and b) a lower infrastructure layer having a network-centric architecture, with a compute server infrastructure layer having an adaptive compute architecture, and with a data storage infrastructure layer having a storage network architecture. In some embodiments, the distributed component architecture facilitates tiering in the n-tier architecture and tiering exploits a shared services model in the service-driven architecture. In some embodiments, the upper infrastructure layer is adapted for component, application and service distribution and the lower infrastructure layer is adapted for centralization within a network.

According to another illustrative embodiment, a method for creating an end-to-end e-business system for an enterprise includes: providing a strategic architecture roadmap including: a) an upper infrastructure layer having a service-driven architecture, with a virtual application layer having a distributed component architecture, and with a an application infrastructure layer having an n-tiered architecture; and b) a lower infrastructure layer having a network-centric architecture, with a compute server infrastructure layer having an adaptive compute architecture, and with a data storage infrastructure layer having a storage network architecture; and applying the strategic architecture roadmap during the creation of an end-to-end e-business system for an enterprise.

In various embodiments, application computers, client computers and other computers and/or servers can include any appropriate computers. Illustrative computers can include, e.g.: a central processing unit; memory (e.g., RAM, etc.); digital data storage (e.g., hard drives, etc.); input/output ports (e.g., parallel and/or serial ports, etc.); data entry devices (e.g., key boards, etc.); etc. Client computers may contain, in some embodiments, browser software for interacting with the server(s), such as, for example, using hypertext transfer protocol (HTTP) to make requests of the server(s) via the Internet or the like.

Various embodiments, advantages and/or benefits of various embodiments of the present invention will be appreciated based on the present disclosure. It is contemplated that various embodiments will include and/or exclude different aspects, advantages and/or benefits and that descriptions of aspects, advantages and/or benefits of the various embodiments should not be construed as limiting other embodiments nor the inventions claimed.

BRIEF DESCRIPTION OF THE DRAWINGS

The attached figures are shown by way of example and not limitation, in which.

DETAILED DESCRIPTION OF THE PREFERRED EMBODIMENTS

Figure 1:
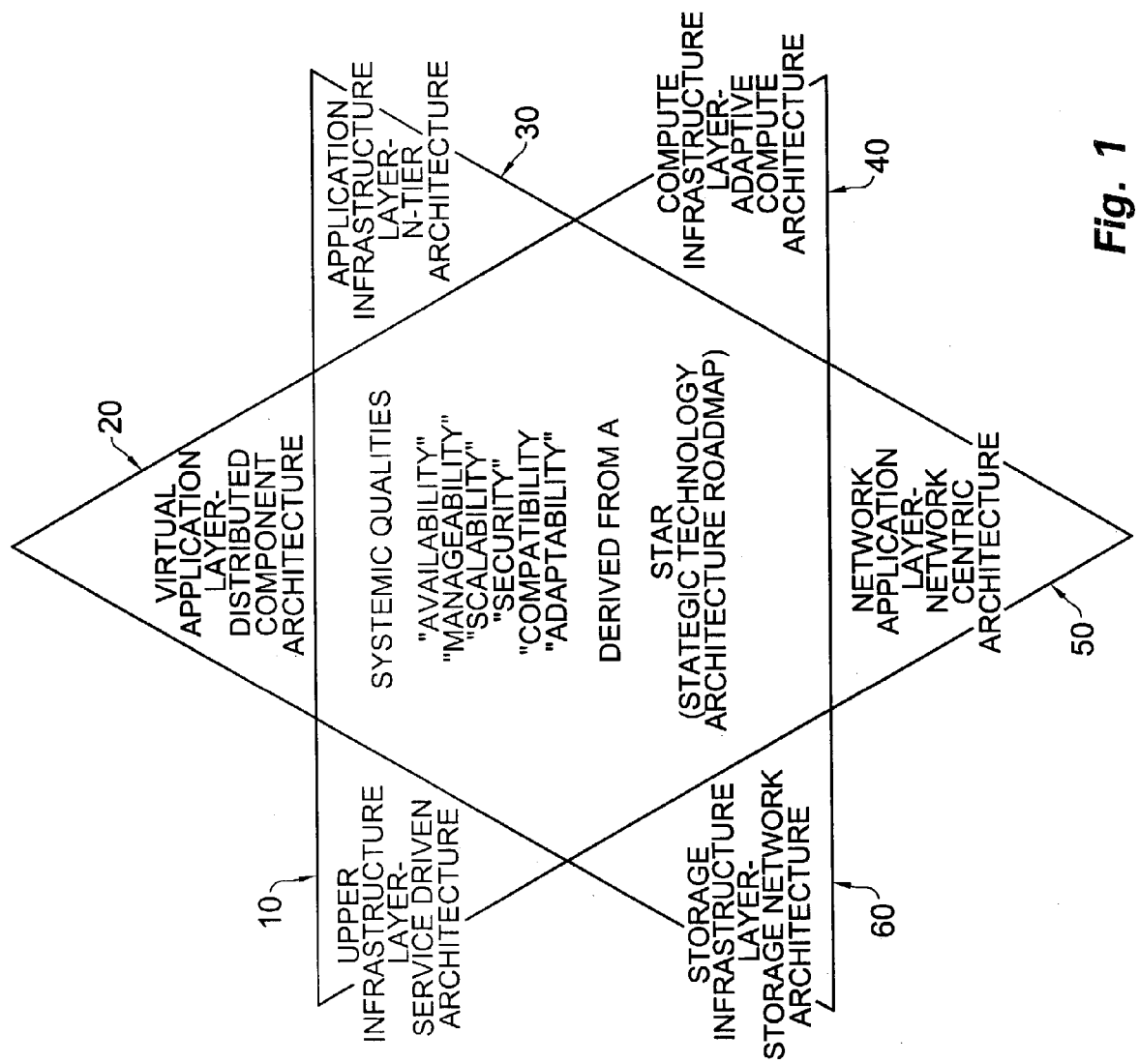
FIG. 1 is a schematic diagram of a STAR architectural framework according to some embodiments.
Figure 2:
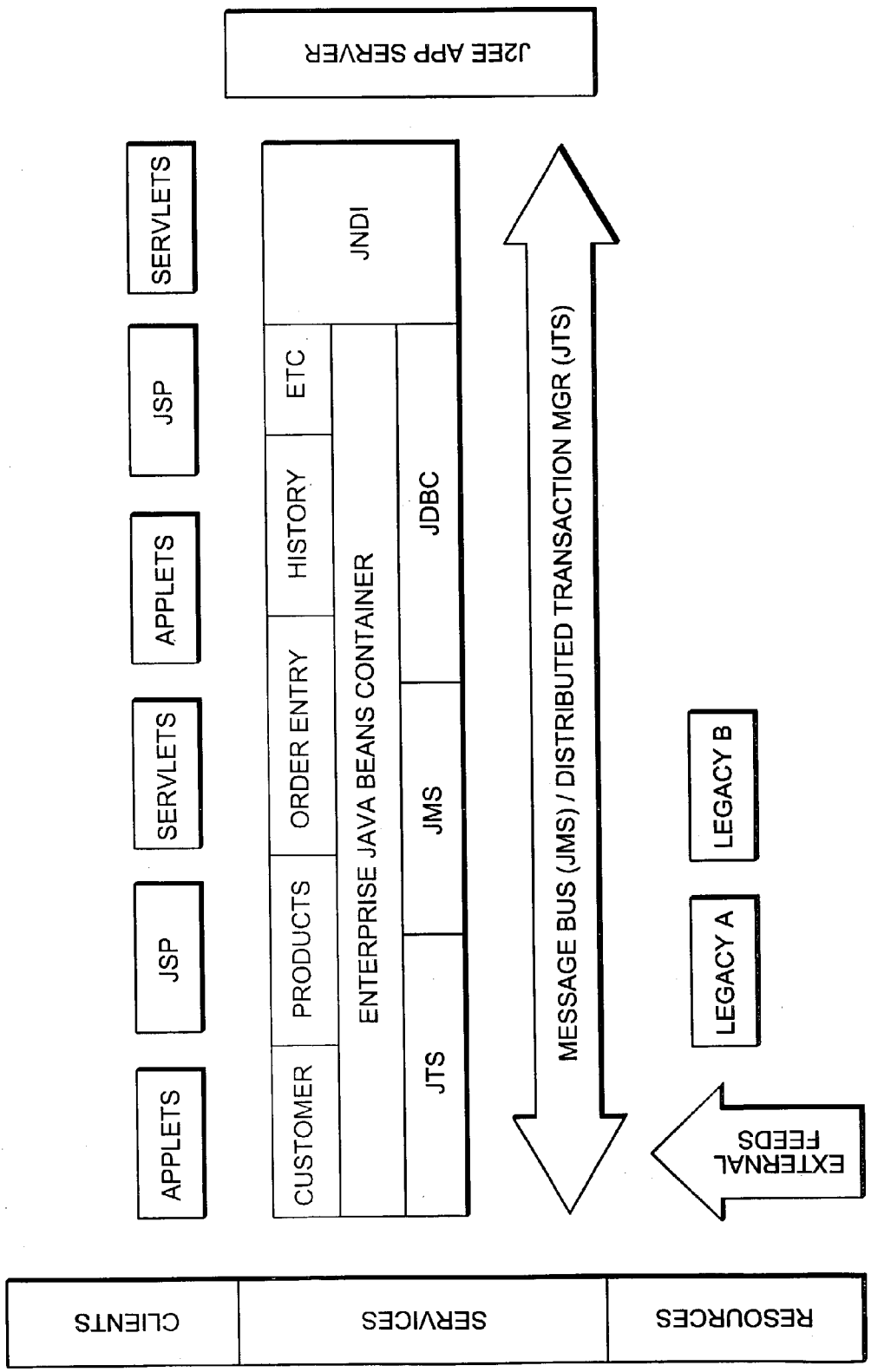
FIG. 2 is a schematic diagram showing illustrative Internet-facing applications built on J2EE components.
Figure 3:
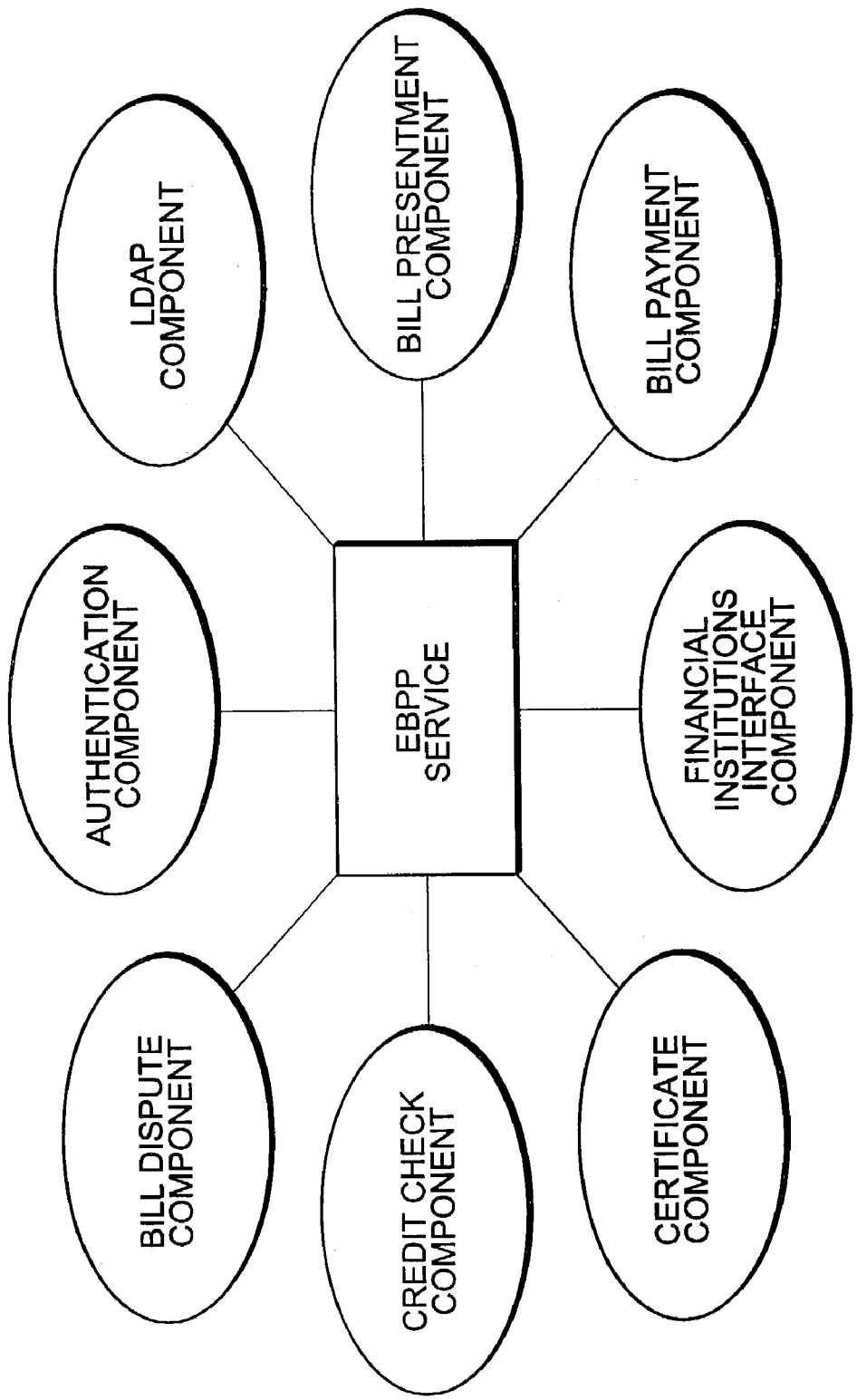
FIG. 3 is a schematic diagram illustrating a distributed component architecture according to some embodiments.

As discussed above, the preferred embodiments of the present invention provide a "Strategic Technology Architecture Roadmap" (STAR), which can provide an end-to-end framework for all or all or substantially all the technologies in an enterprise, including those used by its trading partners and external customers. In most preferred embodiments, this "roadmap" applies to essentially all of the technologies in an enterprise and the STAR framework encompasses and ties together the various architectures in an enterprise—such as, e.g., networks, systems, application infrastructures (such as, e.g., databases and directories), and functional applications—toward a preferred goal of transforming it into a true e-business.

Application architectures (such as, in preferred examples, those based on J2EE™ technology) drive the application infrastructure architecture (Web servers, application servers, database servers, messaging servers, media servers and so on). In turn, the application infrastructure required to run, for instance, a J2EE technology-based application dictates the network architecture and the selection and design of the compute resources and data storage platform. The application infrastructure can be analogized as the "glue" that binds itself with the rest of the infrastructure to offer to it's users what are referred to as "systemic qualities." Table 1 below provides a partial list of technologies.

TABLE 1

| illustrative infrastructure layers & associated technologies. | | |
| --- | --- | --- |
| Application | Application Layer | J2EE ™ Technology Platform (e.g., EJB ™, JSP ™, Servlets, Applets) |
| Infrastructure | Application Infrastructure Layer | Application Infrastructure Technologies (e.g., PKI, XML, LDAP, SQL, HTML, JMS, JTS) |
| Infrastructure | Management Infrastructure Layer | Management Infrastructure Technologies (e.g., SNMP, JIRO ™, JMX, MIBS) |
| Infrastructure | Network Infrastructure Layer | Networking Technologies (e.g., VLAN, TCP/IP, RIP, DMZ, Switching/Routing) |
| Infrastructure | Compute Server Infrastructure Layer | Compute Server Technologies (e.g., UltraSPARC ™ III, DSD, ADR, Gigaplane) |
| Infrastructure | Data Storage Infrastructure Layer | Data Storage Technologies (e.g., NAS, DAS, SAN, Solid State, HSM, SNDR, II, FC/AL, Fabric) |

Some aspects of the STAR framework originate from the inventor's collective realization that, e.g., an e-business can outperform traditional businesses by, e.g.: adapting more rapidly to market changes; responding faster to customer needs; operating at the lowest possible cost; and/or managing the creation and termination of market relationships as needed via, e.g., the Internet.

To capture these advantages, an enterprise should preferably integrate its systems, including e-commerce, ERP (Enterprise Resource Planning), CRM (Customer Relationship Management), KM (Knowledge Management), SCM (Supply Chain Management), and so on. E-business applications enable an enterprise to move into the world of substantially "always on," using the Internet, an intranet, and/or an extranet (e.g., or VPN) platforms, for instance, to protect margins, develop competitive advantages, expand channels, and/or provide knowledge and access to all employees, regardless of their client devices.

Large-scale electronic retail and business-to-business procurement Web sites are growing at a very large rate. This leads to the capturing of substantially every piece of the data associated with substantially every customer's purchasing experience, which—in turn—can lead to, e.g., more effective data mining, more efficient online buying, better focused product marketing and/or a general optimization of supply chain activity.

The Architectures in the STAR Framework

Preferred embodiments of the present invention can assist an enterprise architect in designing a solution that covers all or all or substantially all of the facets of the computing environment, including, e.g., applications, systems, servers, storage and networks. The preferred embodiments of the present invention identify a framework for the dominant reference macro architectures that play a substantial role in each of these areas and puts them into a single perspective. In today's IT industry, many architectural models are known, such as, e.g., "Network-Centric Architecture," "Distributed Component Architecture," "N-Tier Architecture," "Service-Driven Architecture," "Adaptive Compute Architecture," "Storage Network Architecture," "Standards-based Architecture" and the like. In preferred embodiments, the STAR framework demonstrates that each one of these generic architectures is mainly applicable in certain areas (such as, e.g., application, storage, and the like) and that when combined they can offer powerful synergistic values. Table 2, below, shows an alignment of architectures and infrastructure layers in some preferred embodiments.

TABLE 2

STAR infrastructure layers and associated architectures

| STAR Architecture Layer | Corresponding Generic Architecture |
|---|---|
| Virtual Application Layer 20 | Distributed Component Architecture |
| Application Infrastructure Layer 30 | N-Tier Architecture |
| Upper Infrastructure Layer 10 | Service-Driven Architecture |
| Lower Infrastructure Layer 50 | Network-Centric Architecture |
| Compute Infrastructure Layer 40 | Adaptive Compute Architecture |
| Storage Infrastructure Layer 60 | Storage Network Architecture |

Layering of an Enterprise Technology Environment

Implementing the various architectures described above involves, e.g., a combination of hardware, software, and networking technologies. Platform requirements such as, e.g., processor speed, storage access, network bandwidth, operating system environment, and application infrastructure can vary considerably, depending on the services being implemented, and can change significantly over time. As technology evolves, services can become more sophisticated, and transaction volumes can explode. Rapid development of a service-driven and network-centric architecture depends on creating a flexible platform (e.g., network hardware and software) environment that adapts rapidly in response to changing platform requirements. Typically, service-oriented processing is complex. It may require the development of network-callable services that can handle:

Large numbers of concurrent users.

Techniques for security, scalability, and availability.

Support for a wide range of access devices.

Integration with back-end legacy resources through a variety of synchronous and asynchronous communication protocols.

New classes of system software have rapidly evolved over the last several years to support these complex requirements. Web servers, application servers, LDAP servers, ORDBMS, message-oriented middleware, transaction managers, content servers, ORB servers, proxy servers, WAP servers, portal servers, and the like provide most of the fundamental processing requirements, allowing developers to focus more exclusively on the business-specific aspects (e.g., functional requirements) of Web-based application development—including, for example, business services. Many of these products can be combined to provide a complete application-hosting environment, substantially totally independent of the underlying hardware and operating system environment. Today it is these products, rather than the underlying hardware and OS, that present the processing facilities necessary for application development.

In this context, the e-business technology platform, for instance, can then be divided into two primary layers:

The Lower/Network Infrastructure Layer

This layer includes the processing, storage, and network hardware, as well as the operating system and network protocols. The lower layer includes a network that isolates storage (e.g., a storage area network [SAN]) in a "storage infrastructure layer" and another network (e.g., a local area network [LAN]) that isolates compute servers that house these services (basic application infrastructure) in a "server infrastructure layer."

This logical and physical layering between consumption of processing power and memory (in the server infrastructure layer) and storage (in the storage infrastructure layer) lays the groundwork for a flexible and adaptive infrastructure. It also addresses many issues faced currently in, e.g., the e-business world, such as, e.g.: scalability (e.g., support for higher number of nodes in a cluster); manageability (e.g., online/non-intrusive backups); availability (e.g., isolation of back-up traffic, networked mirroring, networked RAID, and the like); security (e.g., isolation of data); and compatibility (e.g., support for heterogeneous storage subsystems and compute servers). In other words, the lower infrastructure layer includes, e.g., all or all or substantially all system hardware that forms the necessary infrastructure to run the upper service layer.

The Upper Infrastructure Layer

This layer includes products such as network management servers (for example, TME), problem management servers (for example, Remedy), Web servers (for example, Apache), application servers (for example, iPlanet™), and various types of middleware (for example, Tibco, Tuxedo, and so on).

This upper infrastructure layer includes all the application software in an IT environment, including management, e.g., software services that manage change, content, configuration, problems, systems, and/or the network. This can include, e.g., basic software services such as application servers, Web servers, mail, FTP, HTTP, DNS, DBMS, messaging, transaction management, and/or CORBA services; and can also include business services, such as, e.g., bill presentment and payment, accounts receivables, inventory management, and others.

In preferred embodiments, notable aspects of this upper layer may include portal services for such sites as a B2C portal (e.g., for consumers), a B2B portal (e.g., for business partners and suppliers), and/or a B2E portal (e.g., for enterprise employees), each offering a window on a combination of services for a particular type of user population. In preferred embodiments, the upper infrastructure layer includes the application infrastructure layer and the virtual application layer.

The Application Infrastructure Layer

This layer preferably includes the combination of all or all or substantially all of the basic services that form the application platform, and it preferably includes such services as DBMS, FTP, DNS, e-mail, search engine, document management, and/or the like.

The Virtual Application Layer

This layer preferably includes, e.g., the Java™ technology components, such as presentation logic (e.g., JSP™/servlets), business/application logic (e.g., EJB™), and data access logic (e.g., JNI, JNDI, JMS, JTS, JDBC™, Java IDL, and so on). This virtual layer preferably introduces a virtual machine (e.g., in the browser/client side, in the Web server/application server, and in the database server side) between application components and the basic services.

Many upper-infrastructure layer products today are available on a wide variety of lower infrastructure layers. Applications written to run on these products can be deployed on any compute/storage infrastructure layer. These applications may remain unaffected by future hardware and operating-system changes because of their independence from the underlying lower infrastructure layer. But there remains the potential problem of their dependence on the upper infrastructure software; this product space is radically changing today. Applications should preferably maintain independence from the application infrastructure layer, too.

Most Popular Application Servers Compliant with J2EE™ Technology

Some of the most popular application servers compliant with J2EE technology are listed below for reference.
  iPlanet Application Server
  BEA WebLogic
  IBM WebSphere
  ATG Dynamo
  Sybase Enterprise Application Server
  Oracle Application Server
  Cold Fusion
  Bluestone
  Gemstone
  Iona Application Server
  SilverStream
  Persistence PowerTier In addition, there are many more vendors that offer application server platforms compliant with J2EE technology, and almost all of them support their application servers on at least three different operating systems.

The requirement for application independence leads to the virtual application layer, which provides standard APIs and specifications. By writing applications so that they are dependent only on virtual application layer APIs, developers can be assured their applications are portable. Beyond application servers, vendors also offer other servers that are J2EE technology-compatible: messaging servers based on JMS specifications, transaction servers based on JTS specifications, and CORBA servers based on Java IDL specifications. There are several Java technology application vendors (ERP, CRM, SCM, and so on) who offer their applications as EJB components that will run on any application-server platform. Each of the generic macro architectures discussed earlier plays a significant role in each of these layers. The storage network architectures and server-centric architectures are most applicable to the lower infrastructure layer. On the other hand, the service-driven architecture is applicable to both layers, the upper infrastructure layer and application infrastructure layer. Component-based architecture relates to the virtual application layer. And, the n-tier architecture primarily relates to the application infrastructure layer. This is schematically illustrated in FIG. 1.

Relationships Between STAR and Generic Architecture Layers

Preferably, the IT architect works in conjunction with the systems architect, the application architect, the storage architect, and so on, to ensure that the guiding principles behind each of these architectures are adhered to and implemented at each one of the layers.

There are synergies associated with all of these architectures that should be harnessed. One example is the storage/server/network consolidation (also referred to as "architecture consolidation"), where the goal is to make an entire network act as one gigantic super computer that scales in storage capacity and processing power as a business grows. Historically, in computing environments where a specific client/server application met a specific need of the organization, hosting this application in a computer (e.g., low-end, midrange, or high-end) made sense in an enterprise with a defined set of users, a regular timeframe (for example, 8:00 a.m. to 8:00 p.m., Monday through Friday), and defined geographical boundaries.

But in today's highly integrated e-business applications, which preferably cater to the needs of the entire stakeholder community (e.g., consumers, other businesses, suppliers, distributors, investors, employees, and/or others), at all or all or substantially all times and at substantially any location, having just one or a few individual computers (even high-end servers) does not meet these requirements. Therefore, the consolidation of the network, servers, and storage to form a gigantic computer (e.g., that might start off with 4 nodes and grow up to 400 nodes or more) is where some potential synergies of these three architectures at the lower layer lie.

Similarly, at the upper infrastructure layer, the service-driven architecture is dominant, as it combines all the services offered by an enterprise into an e-business solution. At the same time, each of these services is based on a component architecture, which enables layering them into multiple tiers in the first place. This may be analogous to one computer (e.g., the network) and one application (e.g., the combination of all interlinked services).

Preferred E-Business Capabilities

In e-businesses, for instance, a number of capabilities are preferably provided, such as, e.g., scalability, compatibility, reliability, and/or the like, that are fundamental to doing business on the Web. Some of these capabilities are discussed below.

Scalability

Today's enterprises typically operate in an expanded world in which customers, employees, and/or suppliers are scattered all around the globe, and in which usage patterns vary day to day. These types of resource consumption leads to unpredictable and sometimes sudden large spikes in demand. If an enterprise IT architect addresses these performance and capacity issues at all or all or substantially all layers, the architecture can be said to be scalable.

Compatibility

For universal access, the enterprise's systems are preferably compatible with substantially any network-enabled device. In some illustrative examples, business may not only run from applications running on desktops or the like, but, e.g., a sales executive on the road may need to retrieve product-specific information from the back end of an e-business via a cell phone, a PDA, or some other Web-enabled device or the like.

Availability

In preferred systems, periodic service outages are not acceptable. In preferred systems, the Web requires one's business to be available substantially around the clock, 365 days a year, substantially non-stop. Customers are shopping online during the weekends. And, for instance, when it is midnight in New York, one's Japanese supplier might be submitting an online bill across continents or the like. Availability and uptime are fundamental to the survival of an e-business.

Manageability

In preferred systems, with today's around-the-clock availability requirement, new ways to manage one's enterprise's systems are often needed. These new techniques include, e.g., server-free/LAN-free disk to media backups without substantially any service disruptions, upgrades and migrations without substantially any impact on the services being provided, and other substantially non-disruptive management functions. Manageability in terms of adapting to change can determine the long-term success of the e-business initiative.

Security

In preferred systems, it can be essential to assure users privacy, confidentiality, data integrity, and/or virus protection while keeping unauthorized users out. Security can directly impact the generation of new customers to one's e-business site and can sustain existing customers.

Adaptability

As the business world changes, the requirements change: new applications are needed; new features within applications are demanded; data growth leads to new storage requirements; new business partnerships require new system interfaces; new business opportunities call for merging existing applications and data, and so on. E-business architecture must be able to adapt to new requirements.

The Virtual Application Layer with the Distributed Component Architecture

In preferred embodiments, within this layer the application architect, for instance, focuses on which J2EE technologies or the like to use for a particular application, such as, e.g.:

JavaServer Pages™ (JSP™), servlets, and applets or the like for the presentation;
JavaBeans™ and Enterprise JavaBeans™ (EJB™) or the like for the business logic;
Java technology with embedded SQL such as SQLJ or the like for the database logic;
JMS/XML or the like for message-based integration with other internal enterprise applications and B2B applications;
Java Transaction Service (JTS) or the like for distributed transaction management;
Java IDL or the like for interfacing with, e.g., non-Java technology applications based on, e.g., CORBA, RMI, and RMI/IIOP (e.g., for communication between applications based on, e.g., Java technology within a network and distributed applications on the Internet);
JCE or the like for encrypting and decrypting, e.g., Java and XML components; and/or
JMX or the like for instrumenting applications based on, e.g., J2EE technology with application management capabilities and interfacing with systems and network management services.

The application architect or the like building on, for example, the J2EE platform may face decisions and choices such as:

Use of stateful session beans, stateless session beans for client application interactions, session beans vs. entity beans;
Use of container-managed transactions vs. bean-managed transactions;
Use of container-managed persistence vs. bean-managed persistence;
Use of, e.g., JSP technology vs. servlets or a combination of the two;
Buy vs. build for business services/EJB components or the like;
Deployment descriptor-based declarative vs. programmatic authorization or the like;
Options for setup of protection domains within and between containers or the like; and/or
Java connectors for various back-end legacy systems of the like.

J2EE technology, for instance, is an object-oriented, distributed-component-based platform that defines a set of specifications for how applications based on Java technology are to be designed and integrated. Notable benefits of this distributed component architecture, where an application is sliced and diced into manageable modules and components, include compatibility and manageability. With this form of technology, multitudes (e.g., millions) of lines of code can be written in a modular fashion and thus divided into manageable pieces. The component model based on object-oriented principles permits pluggable modules under a common framework for applications. An illustrative example this is the iPlanet™ Administration Console, a user interface that permits the administration and management of the basic services such as the iPlanet Directory Server, Mail Server, Web Server and so on. The Console shows plugins to the basic framework relevant to the configuration of the applications. If a RADIUS Server (e.g., an optional package for remote users with dial-in authentication services) is part of the configuration, it shows up under the iPlanet Administration Console as another component that can be managed.

Moreover, component-based J2EE applications or the like allow for tiering the applications in the application infrastructure layer to offer scalability in the application platform layer. The component-based J2EE technology model or the like means you can locate:

Presentation logic on a portal/Web/proxy/WAP server;
Application logic on the application server;
Data logic on the DBMS server;
Messaging logic on the messaging server;

Distributed transaction logic on the transaction server; and/or

Digital certificate/signature logic on the certificate server.

This distributed architecture at the virtual application layer allows, e.g., scalability within and outside a compute server box, as well as increased availability, because, e.g., application components can be distributed redundantly. For example, EJB components can be dispersed among multiple application servers with state/session synchronization, a technique that makes all the application servers "aware" of who is connected and what is being accessed and executed by those users.

This architecture also addresses techniques such as "sandboxing" security, which allows for distributing and accessing application components in a secure manner. Beyond sandboxing, deployment descriptors (e.g., offered by containers of an application server) in conjunction with protection domains offer descriptive authorization between components at the virtual layer. J2EE technology-based applications can also be built with programmatic authorization, offering a fine-grained model for addressing an application's internal "components" security. Message protection for privacy and integrity is significant for B2B applications where XML messages are sent over the Internet from one site to another. This component-level security can be supported by mutual authentication at the virtual layer based on digital signatures and certificates offered by PKI-based basic services. Component-based architectures are appropriate and recommended for all or all or substantially all application architectures. Each of the services offered in a service-driven architecture, whether it is a management service, a basic service, a business service, or a portal service, is essentially an application based on the component model. A component-based application typically provides an architecture one designs, module by module, as opposed to an application architecture one inherits.

One significant benefit of this component-based model is the capability to upgrade one component without impacting the others in the architecture. For example, a decoupled application, where the presentation logic is isolated from the business logic, can be migrated to a new look-and-feel without changing substantially any code in the business logic. This is significant in an architecture with a combination of buy and build solutions.

One illustrative example is as follows. Suppose that as part of one's company's e-business initiative, he or she is making bill presentments to his or her customers over the Internet. Due to competitive pressure, he or she faces an immediate requirement to augment this bill-presentment component with bill-payment capabilities. If the billing service is based on a component model, introducing the new capability to make bill payments is a fairly simple step. The upgrade and introduction of the new payment component can be handled on the server side, creating a seamless integration with the existing bill presentment module. Substantially the only change the customer would see is a new icon or the like in the presentment module that leads him or her to make bill payments. This can be further extended, for example, by personalization and cross-selling or up-selling along with the bill view, based on the customer's prior purchase patterns. With such a modular approach, an e-business can start with a set of critical business services and then add and/or remove services and/or components as the business requirements change. The changes can be accomplished at the virtual platform layer with minimal impact on the application platform layer. Components can communicate with each other via standards-based protocols, such as, e.g., CORBA, RMI/IIOP and the like.

The Application Infrastructure Layer with an N-Tier Architecture

The n-tier architecture addresses scalability by tiering an application's logic (e.g., presentation, business, data-access, integration, and so on) between application infrastructure services, thus paving the way for vertical and/or horizontal scalability based on the tier. This layering is made possible because each application infrastructure platform is focused on a service. For example, most of the presentation logic is handled by the Web servers and portal servers; business logic is executed at the application server; common application data (such as, e.g., user information) is accessed from directory servers; and transaction data is manipulated from database servers. Notably, Java technology is capable of executing in all or all or substantially all tiers (e.g., browser, Web server, app server, and database server), and this addresses typical performance issues associated with code traversal and network traffic.

Figure 4:
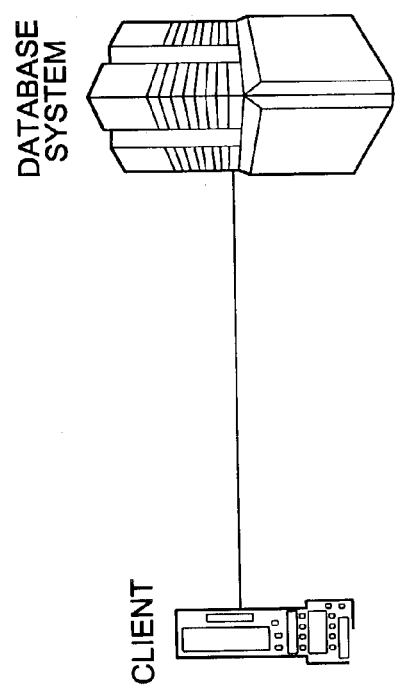
FIG. 4 is a schematic diagram showing a model where a client connects to a single database server for functions.
Figure 5:
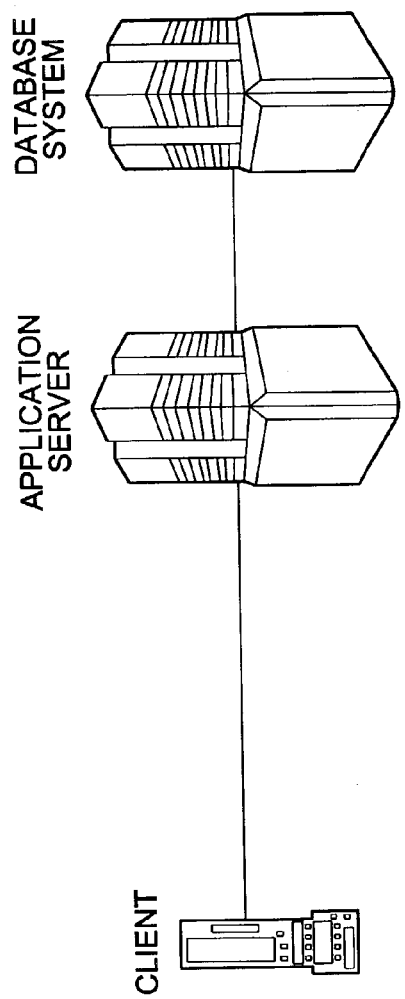
FIG. 5 is a schematic diagram showing a model where a client connects to an application server, which connects to a database server.
Figure 6:
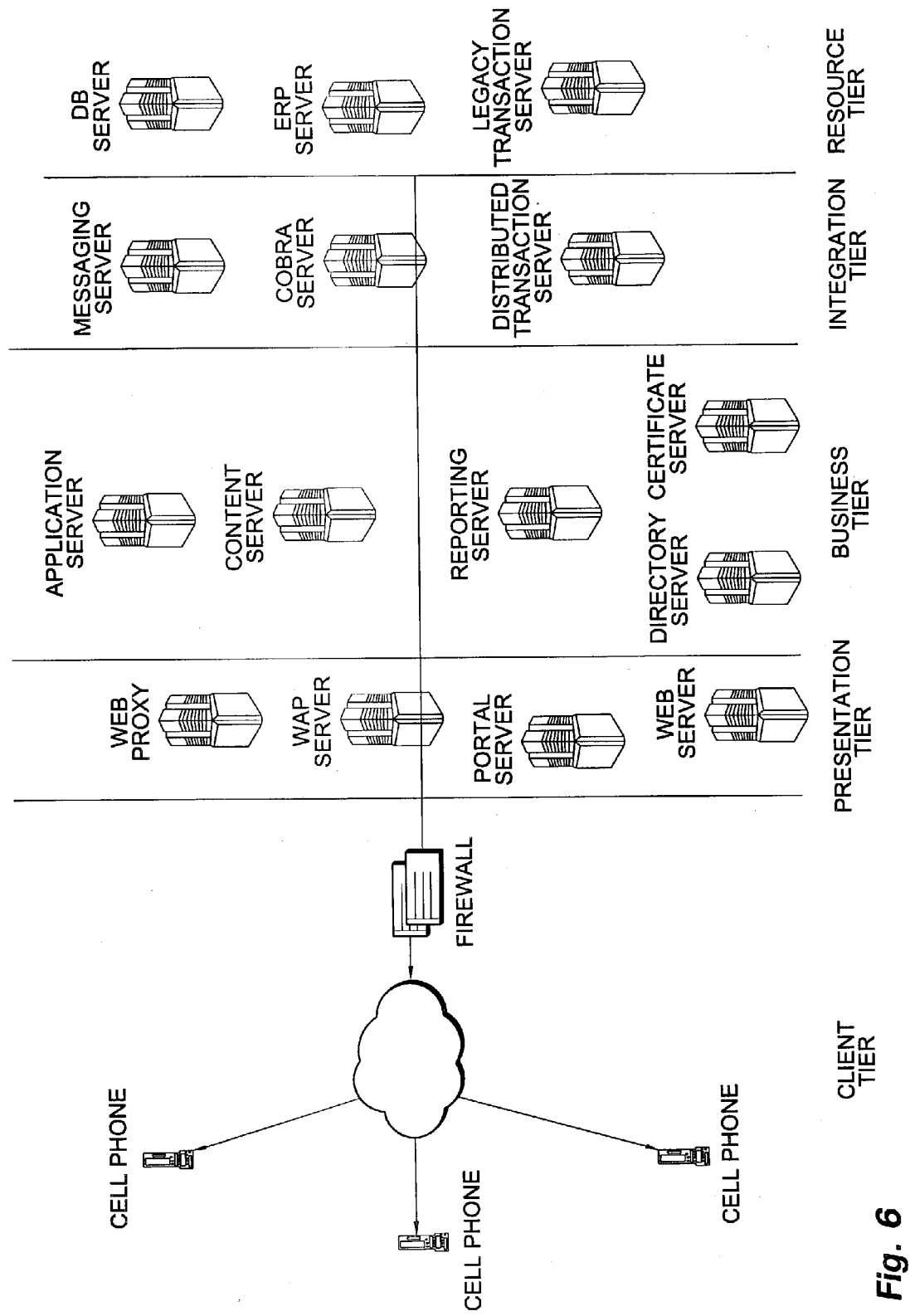
FIG. 6 is a schematic diagram of a multi-tier architectural model.

This layered model also allows for the parallel execution of the application code in all or all or substantially all n tiers, where possible. This, in turn, results in more efficient utilization of all or all or substantially all network resources and better scalability. And, with bottlenecks avoided, uptime and availability can be increased. In addition, new levels of security can be achieved with unique security policies between tiers and multiple secure zones within a network. FIGS. 4, 5, and 6 demonstrate illustrative changes in application architectures from two-tier to three-tier to an n-tier models (the figures showing illustrative and non-limiting examples).

In preferred systems, there are five tiers in an e-business application. These tiers are described below:

The Client Tier: This tier preferably hosts the minimal processing that occurs at the point of client access. In many cases, this means it is basically rendering the content for presentation.

The Presentation Tier: This tier preferably hosts the processing that adapts the display and interaction for the accessing client device, whether it is a desktop computer, network computer, Internet kiosk, cell phone, PDA or any other device. Preferably, typical basic services that run on this tier include Web servers, portal servers, WAP servers, and/or Web proxy servers.

The Business Tier: This tier preferably hosts the logic that embodies the rules of the particular enterprise, irrespective of access device or resource implementation. The primary service that runs on this tier is the J2EE technology-based application server.

The Integration Tier: This tier preferably hosts the formatting and protocol conversion necessary to communicate with enterprise resources. Preferably, the services that run on this tier include messaging server (JMS), transaction servers (JTS), CORBA servers (Java IDL), LDAP servers (JNDI), native interfaces (JNI), and/or others.

The Resource Tier: This tier preferably includes legacy systems or any other back-end or external processing systems. The back-end resources may include, e.g., database servers and/or mainframe transactional servers, as well as ERP, SCM, and/or CRM systems.

Figure 7:
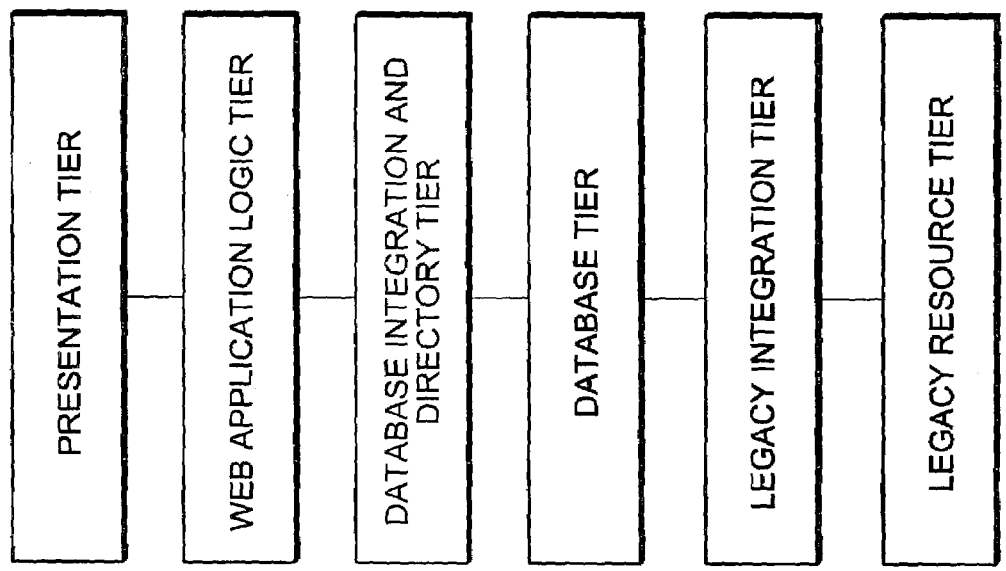
FIG. 7 is a schematic diagram of an illustrative n-tier architectural model.

FIG. 7 illustrates the five tiers that are preferably present in an e-business application. By logically and physically layering an application in this manner, each tier can offer both vertical (e.g., between multiple CPUs) scalability as well as horizontal scalability (e.g., between multiple servers), thus bringing true scalability to the application overall.

Three-tier architectures were embraced by most e-business vendors (such as PeopleSoft and SAP) with the advent of application servers, which were introduced to act as the middle tier between the client and the back-end resources. This aided in keeping client-side code to a minimum (averting the issues associated with fat clients) with remote calls to server-side code. In addition, the three-tiered (and potentially n-tiered) approach has been recognized as well suited for distributing applications over a widely dispersed user population because of the reduction in WAN traffic. And, on the server side, due to connection pooling and multiplexed routing of user connections between set and dynamic connection pools, this approach could result in minimal consumption on the resource tier.

The introduction of the n-tier architecture to, e.g., ERP, CRM and/or SCM applications makes it possible to extend the same systems to the e-business world with the introduction of few more tiers (e.g., such as the presentation and integration tiers). The number of tiers depends on what application infrastructure services the application is going to use. Application infrastructure services are required for an application to run, as opposed to management services that act as a value-added service for specific management functions in the computing environment.

In some examples, these basic application infrastructure services can include the following and more:
  Certificate Server (iPlanet)
  Calendar Server (iPlanet)
  Content Server (Open Market)
  Caching Server (Inktomi)
  Messaging Server (Tibco)
  Transaction Server (Tuxedo)
  Application Server (iPlanet)
  Web Server (iPlanet)
  Integration Server (webMethods)
  Web Proxy Server (iPlanet)
  DB Server (Oracle)
  Reporting Server (Actuate)
  Directory Server (iPlanet)
  SSO/Security Server (Netegrity)
  Mail Server (iPlanet)
  WAP Server (iPlanet)
  Portal Server (iPlanet)
  CORBA Server (Inprise)

Presently, systems are generally not developed with a client-server application in which the application logic resides on the client with the requirement to connect, authenticate, and access data from a single database server. Additionally, systems are generally not developed with a three-tier architecture in which a client accesses an application server (i.e., with the traditional application server acting mostly as a transaction-processing monitor), which, in turn, accesses a database over a LAN or a WAN. Today's service-driven, n-tier environments can incorporate a multitude of tiers (e.g., a dozen or more tiers) in the application architecture—e.g., enough to adequately serve an enterprise's entire stakeholder community.

The Upper Infrastructure Layer with the Service-Driven Architecture

Figure 8:
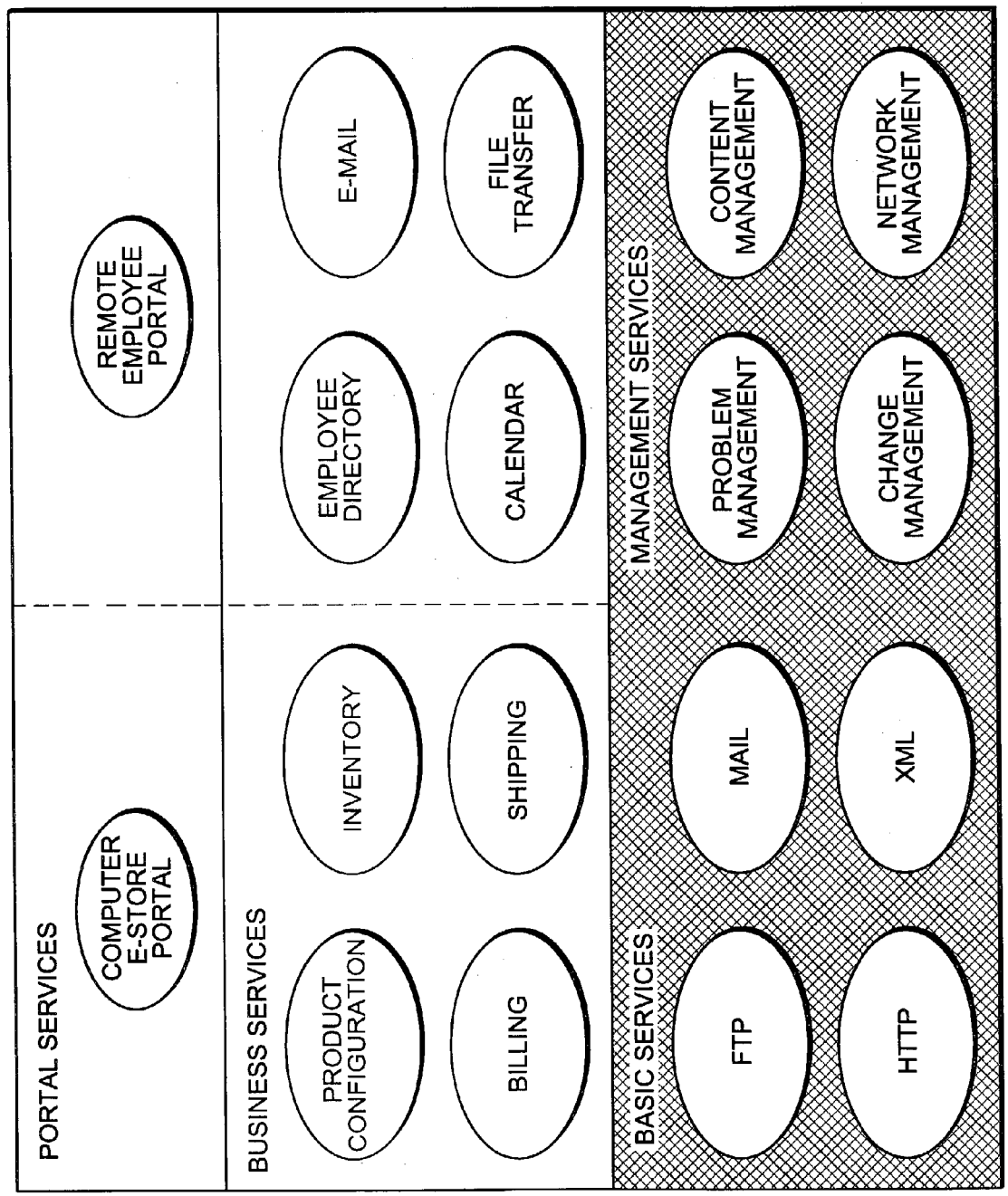
FIG. 8 is a schematic diagram of an illustrative embodiment of basic services in a service-driven architecture.

The upper layer preferably includes portal and business services in the virtual layer, basic services in the application infrastructure layer, and management services in both the virtual application layer and the application infrastructure layer (as depicted in FIG. 8). Preferably, business and portal services are built on top of the basic services. Basic services can include, e.g., mail, FTP, SNS, HTTP, LDAP, DHCP, DBMS, backup, storage, and/or other services. Business services can include, e.g., product configuration services, billing services, inventory services, shipping services, and/or other services that might be offered via portal services, such as, e.g., a portal services for purchasing computers online or other services. Management services include all traditional IT management tools, such as problem management services (e.g., Remedy), change management services (e.g., Atria Clearcase), network management services (e.g., Tivoli TME), systems management services (e.g., SMC 3.0), and so on.

In preferred embodiments, a notable advantage of this architecture is that it offers a set of integrated services based on open standards technologies and protocols, thus addressing compatibility issues. Using techniques such as caching and/or replication, these services can scale to meet a large number of concurrent users. The basic services are generally clustered at the system level to address availability issues, especially as these basic services are shared by all or all or substantially all of the applications in the computing environment. One such basic service can include the certificate management system, based on PKI, which offers security for e-busniess applications. In this exemplary service-driven architecture, a business is essentially made up of network-callable services, where each service is defined as to what it does, who consumes it, and which other services depend on it.

Four preferred distinct service groupings are described below:

Management Services

These services preferably manage and monitor the applications in the virtual application layer, application infrastructure services, networks, compute servers (e.g., the physical boxes) and/or storage. Typical management services include problem management (e.g., Remedy), change management (e.g., Atria), network management (e.g., Tivoli TME), systems management (e.g., SMC 3.0), and storage management (e.g., Sun StorEdge™ Management Console). The responsibility of introducing the management framework to the architecture may lie with the managed-service provider (e.g., Exodus or Digex).

Basic Infrastructure Services

These preferably include application infrastructure services such as directory services, file transfer services, Web services, e-mail services, database services, and/or so on, which are common to many enterprise architectures.

Business Services

These services are preferably built on the application infrastructure services to perform business-specific activities. They may include, for example, credit-card fraud detection services, address verification/validation services, payment authorization services, and/or so on. These services are typically custom-built to each enterprise, whether in the B2B space, the B2C space, a combination of both of these spaces and/or the like.

Portal Services

As discussed earlier, this is preferably where services are aggregated for specific groups of end users. Typically, an enterprise can have an employee portal service (e.g., an aggregate of internally focused portal services), a consumer portal service (e.g., an aggregate of all B2C portals), and supplier/partner portal service (e.g., an aggregate of all B2B portal services).

The Service-Driven Architecture

The basic services are typically the same or similar in all or all or substantially all enterprises and are preferably built on standards such as, e.g., HTTP, HTTPS, IMAP, POP, SMTP, LDAP, FTP, XML, and/or so on. These basic services preferably form the vital application infrastructure on which the business services and/or portal services depend.

The business services may differ from one enterprise to the other. In many cases, these services are built by the enterprise on top of the basic service tier; in other cases, they are purchased as off-the-shelf solutions (such as, e.g., commercially available J2EE technology-compliant applications). For example, there may be a multitude (e.g., hundreds) of portal services in an enterprise and a few that aggregate these portal services into (e.g., master) portal services. (For instance, an employee portal might be an aggregate of several portals: mobile employee, management, professional service division, and/or so on.) This may depend on the size of an enterprise and the extent to which it has migrated to an e-business model.

Portal services are also available today as off-the-shelf products. Keeping in mind some distinctions between the four types of services, this architecture can be viewed as a hierarchical tree of network services offered via a few portal services.

The four services may be combined to form one e-business application. Each service can be meant to offer something unique in value not offered by other services (e.g., other than for availability purposes) in an e-business architecture. For example, there may be only one directory server based on a standard protocol (e.g., LDAP) that offers directory information to other basic services (such as, e.g., e-mail) and business services (such as, e.g., customer contact application). If an application requires forewarning a customer, for example, that his or her bill payment is due in two business days, this application may tap into the e-mail service to automatically forewarn customers about the upcoming deadline.

Viewing a business from this perspective helps reveal that a service-driven architecture compels the enterprise toward a completely integrated e-business application that is modular and componentized. In essence, all or all or substantially all of the services in a network combined make up the e-business system in its entirety. This centralization of the network implies one physical network (e.g., whether at one site or at multiple [e.g., two] sites where, e.g., substantially an entire e-business site is replicated geographically for availability purposes). Similarly, portal services that cater to the needs of the individual user community (for example, B2B, B2C, and/or B2E communities) may use a combination of basic and business services that actually overlap in many cases between each user population. While in many environments there may be no significant distinctions between the services that form the required applications for B2C, B2B, and/or B2E, some distinctions are made possible virtually, via the concepts associated with portals.

The Lower/Network Infrastructure Layer with the Network-Centric Architecture

Figure 9:
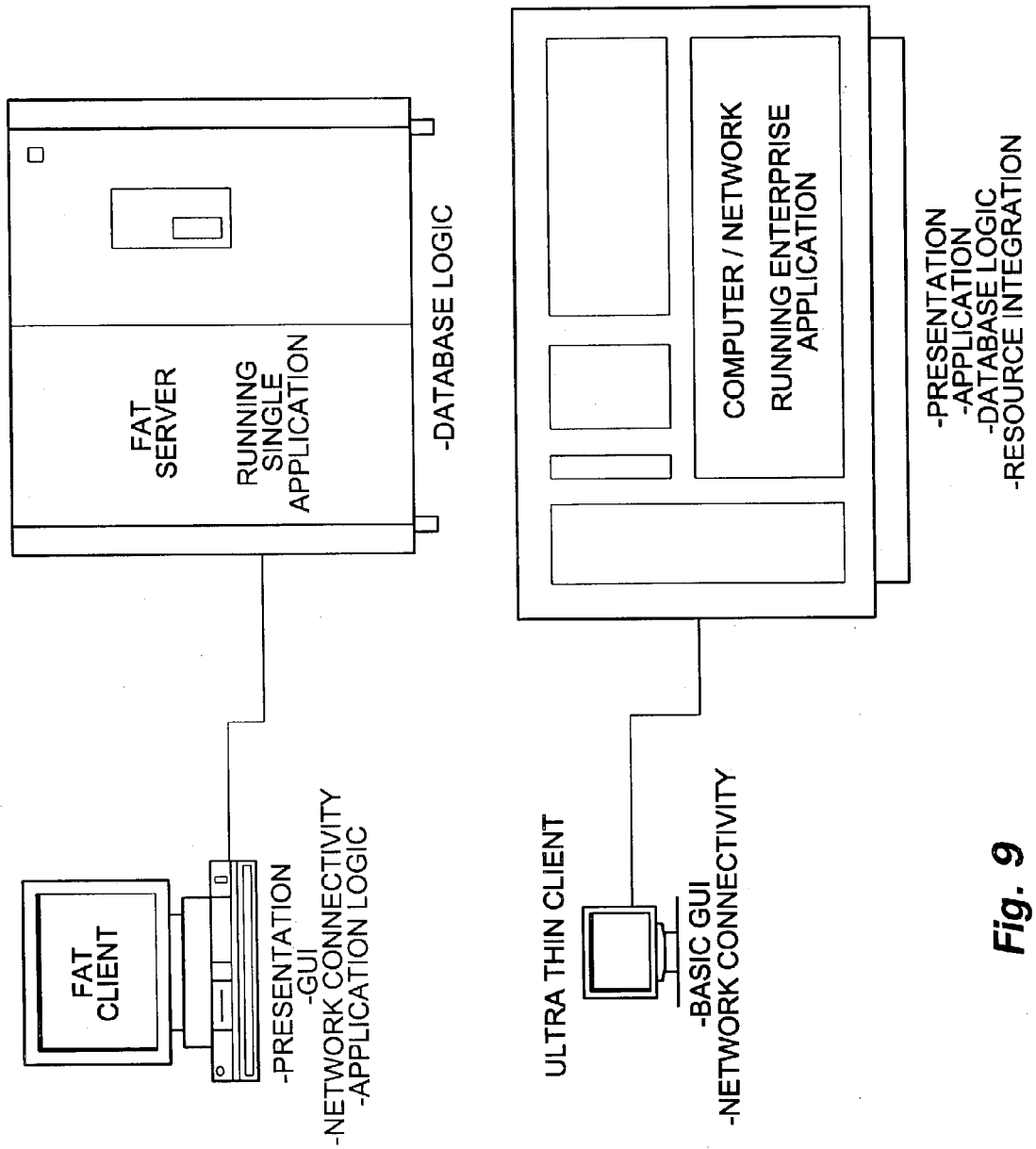
FIG. 9 includes two schematic diagrams of network-centric architecture according to some illustrative embodiments.
Figure 10:
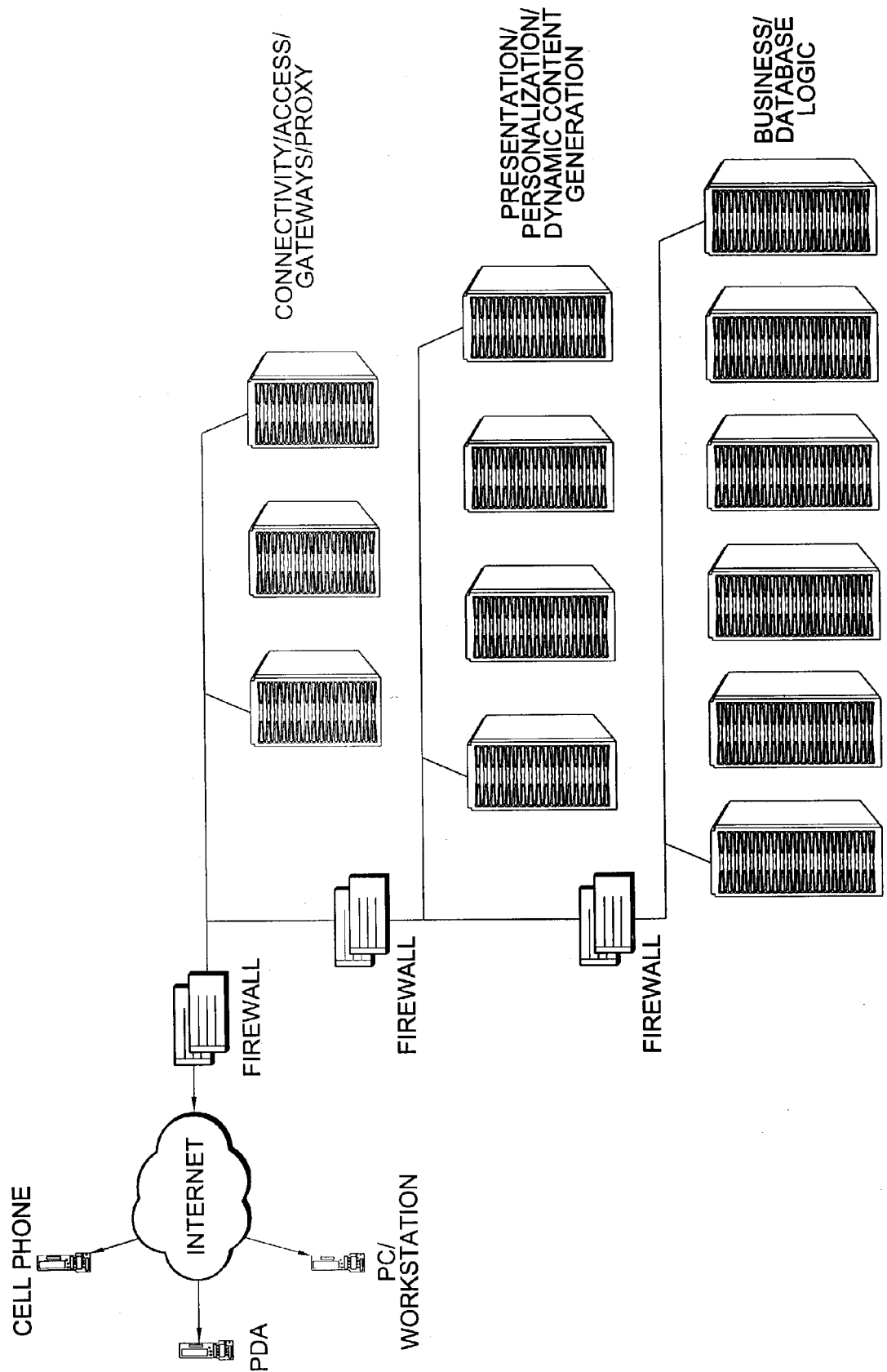
FIG. 10 is a schematic diagram showing an illustrative and non-limiting network-centric architecture consolidated on Sun Fire™ servers as an illustrative example.

The lower layer is preferably dominated by hardware and related technologies such as routers, switches, gateways, servers, storage subsystems, back-up devices, and/or the like. These can be considered, by analogy, as combining to make the network into a computer. In preferred embodiments, a significant driving force behind this architecture includes the desire to keep the client side as thin as possible, but preserving the capability to run substantially anytime, from substantially anywhere, from substantially any device. Preferably, all or substantially all logic, including the presentation logic, is executed on the server side, leaving the client side ultra-thin. This preferred aspect is illustrated in FIGS. 9 and 10.

Adopting techniques such, e.g., virtual LANs, switching, dynamic bandwidth allocation, storage consolidation, and/or the like, the network can scale to address capacity and performance demands. Multiple (e.g., dual) network access points and redundant connectivity mean high availability for the network. Intranet and extranet can merge into one network entity with multiple security mechanisms. Jinim and Java™ technologies on all or substantially all network devices can address the network connectivity and/or compatibility issues. Secure communication to and from this network can be made possible through, e.g., techniques associated with virtual private networks and/or PKI.

In summary, in the service-driven architecture, the services that drive one's architecture are preferably housed primarily on the server side with support for thin clients. This represents a break away from the traditional client/server model of computing, where there were fat clients with many resources residing on both the client side and the server side. These systems used to be islands that met specific requirements but did not integrate with the rest of the systems in the enterprise. These systems were, e.g., offered via the network: LANs for internal users, WANs for geographically distributed users, and VANs (value-added networks) for secure access to EDI-type applications between businesses. With the introduction of the Internet, applications deployed over a LAN can be a good fit for deployment over an intranet, applications offered over a WAN can be a good fit with the Internet, and applications offered over a VAN can be a good fit with extranets (e.g., or VPNs). Today, a common interface for all or substantially all these applications can include a browser, built on standard protocols. The users of these systems preferably have seamless access to all or substantially all applications via portals that connect to the Internet. In some instances, applications with sensitive security requirements can be accessible over the Internet via, e.g., a VPN setup.

A potential added advantage of this model is that it can avoid costs associated with building private networks.

The Server Layer with the Adaptive Compute Architecture

Figure 11:
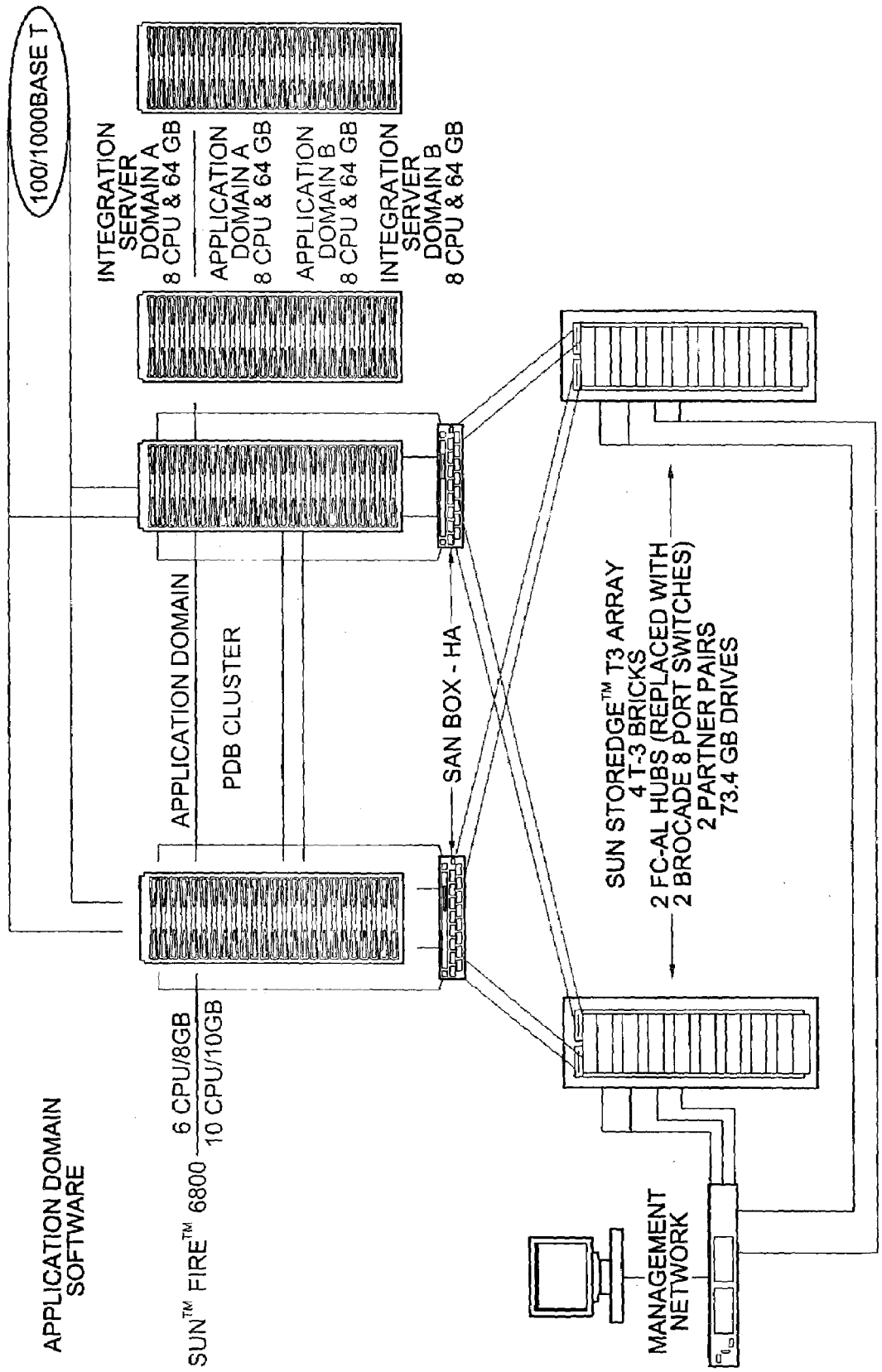
FIG. 11 is a schematic diagram showing an illustrative and non-limiting embodiment of an adaptive computing environment based on Sun Fire hardware.
Figure 12:
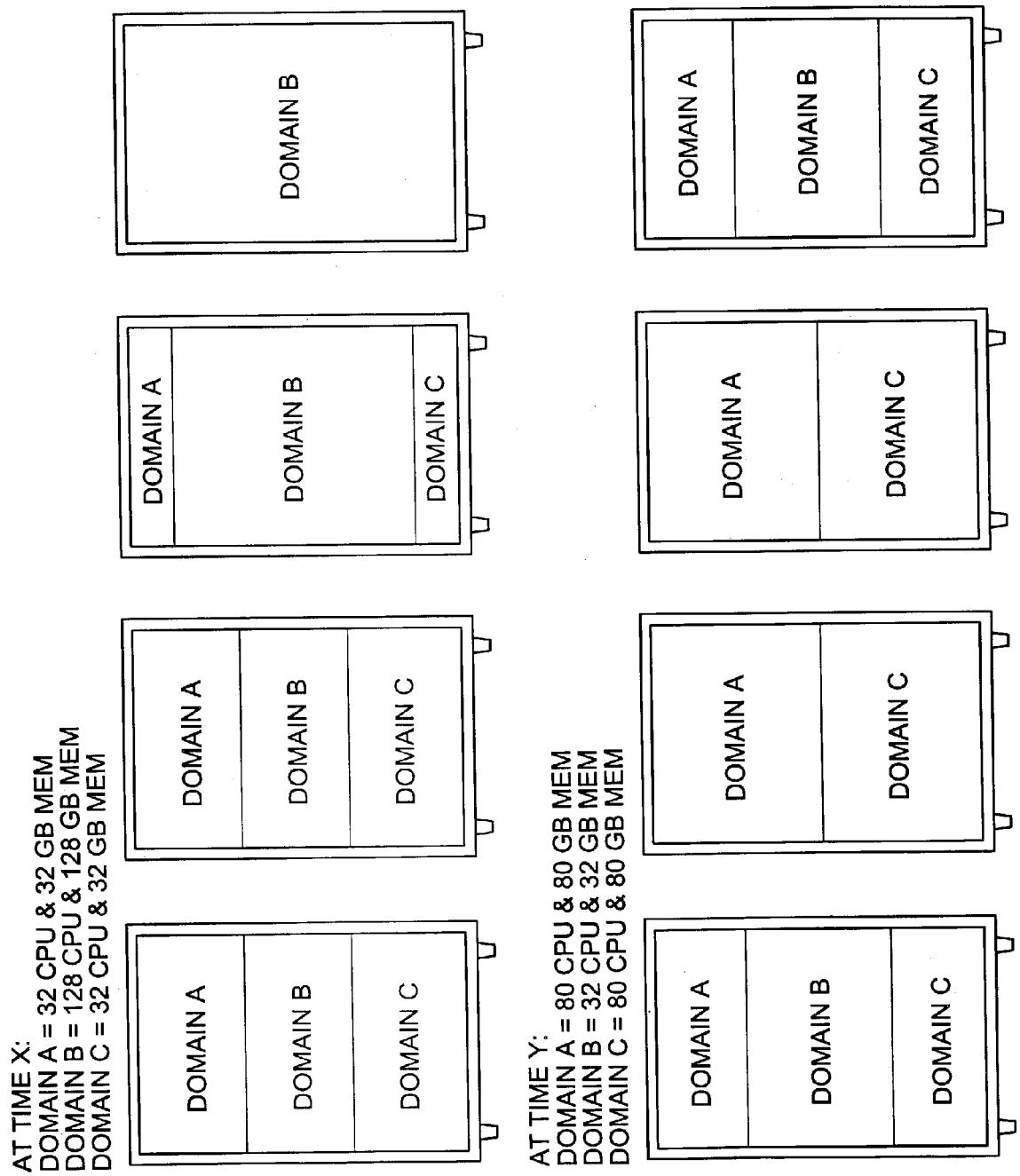
FIG. 12 is a schematic diagram showing an illustrative and non-limiting embodiment of adaptive computing with dynamic compute resource allocation.

The server layer is preferably where all or substantially all compute resources are isolated, all or substantially all the processors and memory that execute code. A significant principle behind this architecture is the dynamic allocation of resources to system domains (e.g., a logical grouping of CPU/memory) based on demand. The dynamic system domain concept applies to all or substantially all physical boxes in the network and can reside within a box or between boxes. The adaptive nature of the server resources makes it possible, for example, to take additional resources from domains in the network that may not be as active at the time and put them toward the database domain during peak periods. This adaptive nature of the computing infrastructure is illustrated in FIGS. 11 and 12. The primary techniques that make this possible include automatic dynamic reconfiguration and dynamic systems domain. With the combination of the UltraSPARC™ port design and the Solaris™ Operating Environment, a symmetric multiprocessing operating system, the server systems in the network can scale dynamically. Redundant and hot-swappable hardware components increase the uptime, adding to the adaptive nature of this system, and manageability can be maintained through server consolidation techniques. The compatibility at the server layer can be established by adhering to standards such as OS versions, patch levels, and/or common communication protocols. Additionally, box or domain tightening can address security at this layer through modifications to specific configuration files such as the inetservices, nsswitch, sysconfig, and/or more.

The next generation of Sun servers based on UltraSPARC™ III may advance the adaptive nature of compute resources, with, for instance, support for hot CPU upgrades, dynamic system domains across all servers, scalable shared memory, remote shared memory, dynamic dispatching of kernel and other OS patches, Solaris™ Resource Manager, Solaris Bandwidth Manager, and/or so on. These technologies combined can offer the capability to assign compute resources on the fly to the applications as they need them.

The Storage Infrastructure Layer with the Storage Network Architecture

Figure 13:
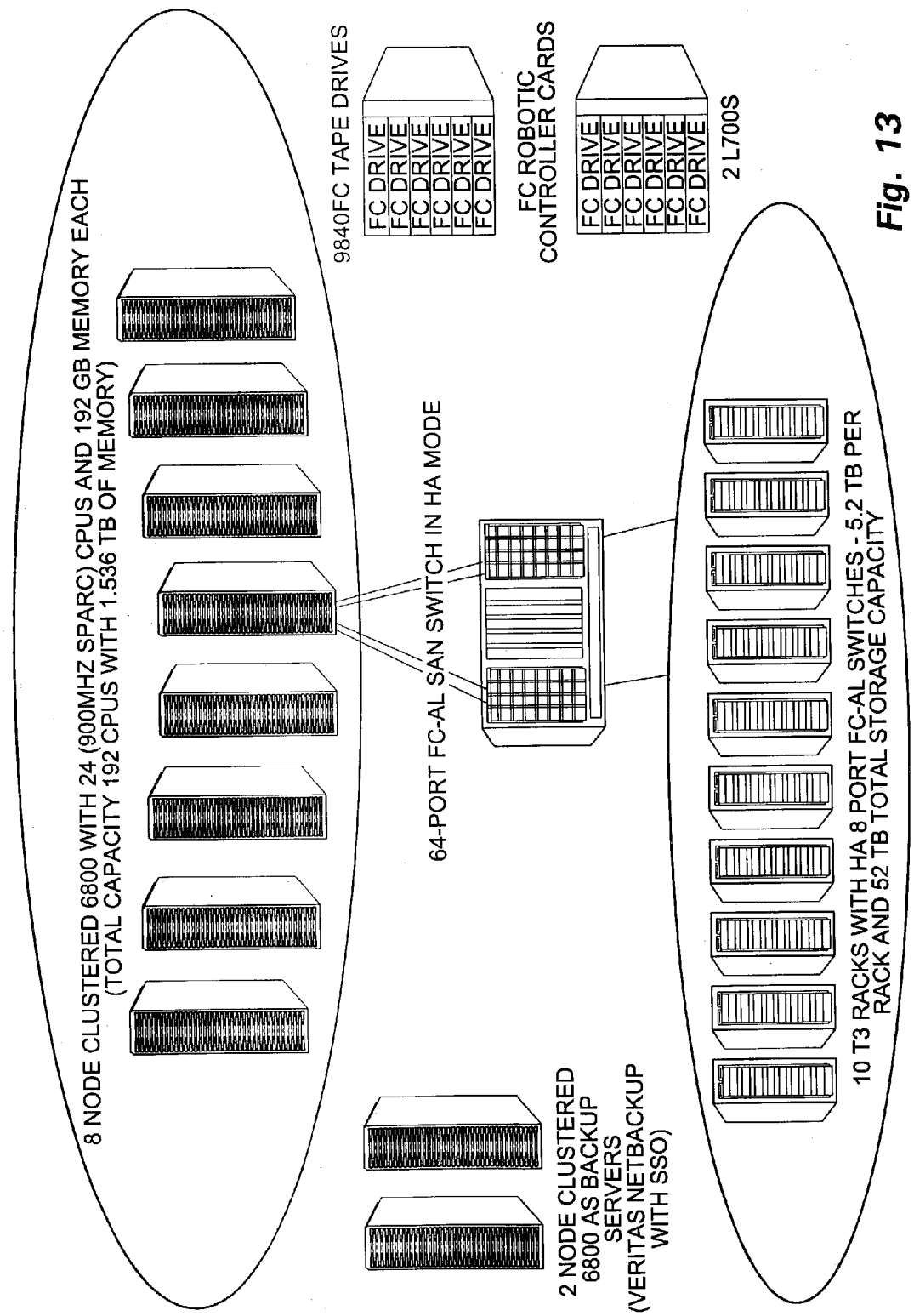
FIG. 13 is a schematic diagram showing an illustrative and non-limiting embodiment of a T3-based SAN architecture.
Figure 14:
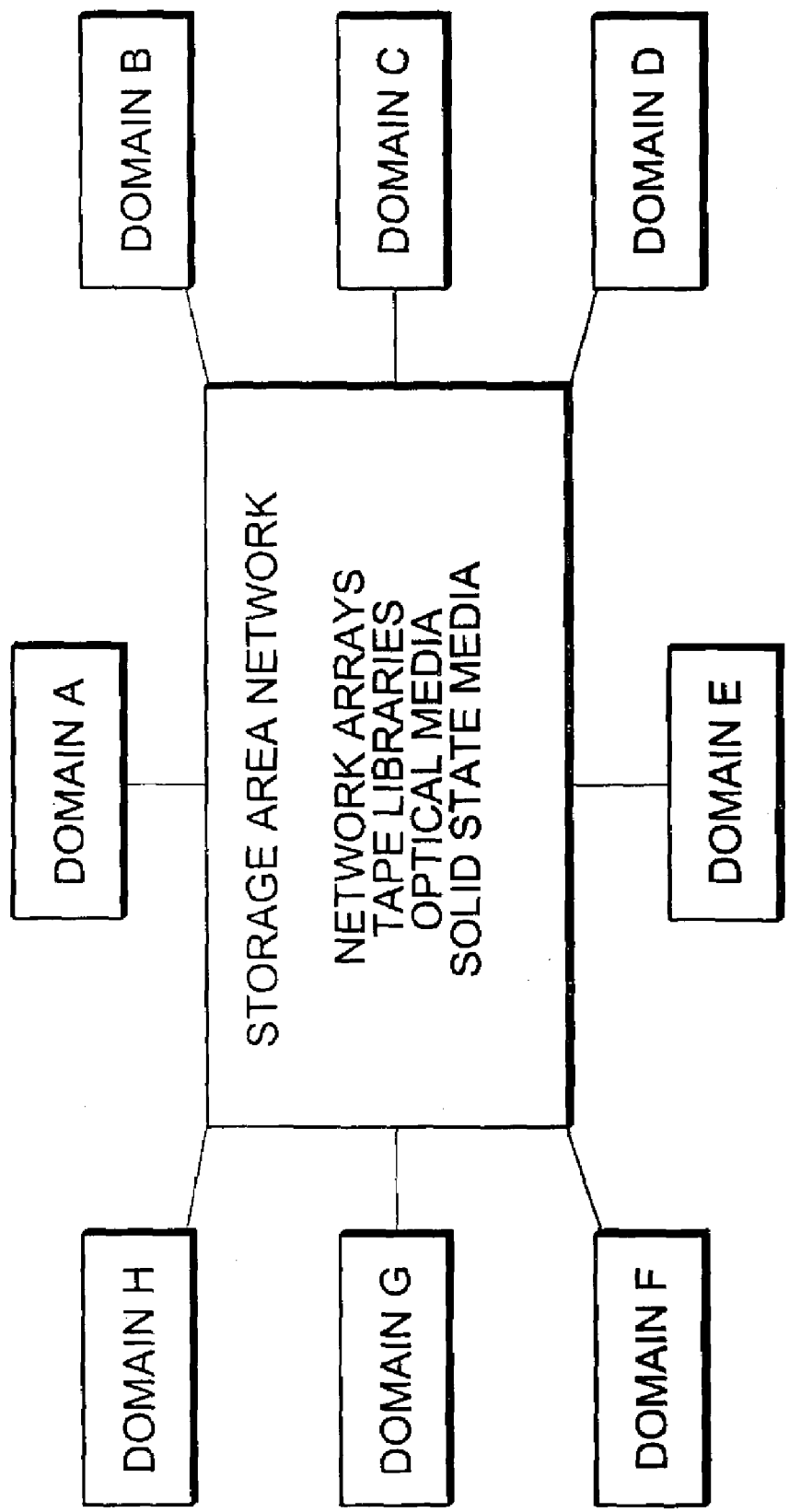
FIG. 14 is a schematic diagram showing and illustrative and non-limiting embodiment of storage centralization and consolidation within a Storage Area Network (SAN).

The storage infrastructure layer preferably holds all or substantially all of the data of the e-business and offers significant value to both the server and the network layer. In preferred embodiments, a significant aspect of this architecture includes that it offers a shared storage model rather than a dedicated storage model. Preferably, it isolates all or substantially all storage devices in a storage area network (SAN), including network-attached storage, solid-state disks, backup devices, optical disks and/or so on (as shown, e.g., in FIGS. 13 and 14).

In preferred embodiments, a significant benefit of the storage-area network architecture is the manageability it offers for "server-free" and "LAN-free" backups and restores. It can also make simpler site-to-site replication for disaster recovery, due to the isolation of all or substantially all data to the SAN. Networked RAID implementations on a SAN can distribute I/O, not just between disks within storage subsystems, but also between disks and storage subsystems. The SAN architecture can also make it easier to add nodes in a cluster configuration, by virtue of an "any-to-any" connectivity model. With the adherence to standards bodies, such as, e.g., SNIA, and standard storage technologies such as, e.g., Jiro, the SAN architecture can significantly address compatibility issues. Data-level and application-level security can also be maintained within the SAN via SAN-enabled logical volume management solutions.

This storage-centric architecture may be a natural fit with the service-driven, server-centric architecture and may be built on the idea of storage consolidation. If an enterprise is based on a service-driven model, all or substantially all services can essentially be code that accesses application/user data and configuration information (e.g., metadata). In this context, metadata can include, e.g., information about the configuration of the services themselves as well as about the interdependencies between these services. Around-the-clock access to such data can be important to the success of the service-driven architecture, and the storage network architecture addresses this key requirement.

In this storage-centric architecture, all or substantially all services offered by an enterprise utilize storage resources from a central storage area network (SAN). When one combines a SAN with a service area network, the system can truly demonstrates "The Network Is the Computer™", because all or substantially all processors and memory are divided between the servers that run services with access to data storage from the SAN.

Portal services can point to the many business services that are required by a particular user community—with access based on, e.g., security policies and profiles—and business services can use underlying basic services that access data from a central SAN (or a plurality of SANs). Accordingly, today's enterprise network preferably works like a well-oiled machine to offer services needed by, e.g., employees, customers, suppliers, and/or partners.

TABLE 3

Overview of Illustrative Correspondence Between Infrastructure Layers And Capabilities

| | Scalability | Availability | Manageability | Compatibility | Security |
|---|---|---|---|---|---|
| Virtual Layer "Distributed Component Architecture" | Multithreaded component (e.g., Java technology) | Redundant application component | Pluggable and reusable | Platform Independence/ Virtual Machine | Sandbox technique |
| Application Layer "N-Tier Architecture" | Parallel execution (e.g., Java in Database) | Optimal resource allocation | Division of workload | Standard connectivity tools (e.g., JNDI, JDBC, RMI) | Firewalls between Tiers |
| Upper Layer "Service Driven Architecture" | Caching & Replication techniques | HA Basic Services | Shared Service model | Built on standard basic services | e.g., CMC/PKI |
| Lower Layer "Network Centric Architecture" | VLAN, bandwidth allocation | Dual NAP, dual connections | Merging Intra/ Extra Net | Singular Network/JINI | e.g., VLAN, VPN, SSL, S-HTTP |
| Server Layer "Adaptive Server Architecture" | e.g., DSD, SMP | Redundant hardware component | Server Consolidation | Standards such as, e.g., TCP/IP | Box Tightening |
| Storage Layer "Storage Network Architecture" | Net RAID, Distributed I/O, additional nodes | Simplified Clustering | LAN-free Server-free Backups | Standards such as, e.g., SNIA & JIRO | Data-level security techniques, Zoning |

Advantages of the Strategic Technology Architecture Roadmap

In preferred embodiments, synergies of these combined architectures can yield strategic value in both the upper and the lower infrastructure layers. For example, component-based applications (e.g., distributed component architecture) can make it easier to tier them in the n-tier architecture, and a tiered approach can exploit the basic shared services model in the service-driven architecture. Moreover, in the lower network layer, centralization preferably governs all three layers: network; server; and storage. Preferably, the adaptive server architecture fits easily into the shared storage model in the storage network architecture, because shared storage can constitute a substantial requirement to make this dynamic system domain technology work across all or substantially all nodes in a network.

One advantage of this framework is that it provides insight into the past, present, and future. Centralized architectures prevailed in the enterprise during the mainframe era; distributed architectures prevailed during the PC era; and a mixture of both—centralized distribution architecture—should rule the Internet era. In preferred embodiments, the upper infrastructure layer can drive the concept of component, application, and service distribution, whereas the lower layer can propose centralization within, e.g., one network (e.g., where the network is, again, analogous to a computer)—as demonstrated by, e.g., a composite of a SAN and a LAN with server/storage consolidation.

Substantially every enterprise develops an e-business plan that addresses the direction an enterprise will take, both in the short term and in the long term, to meet the needs of a digital economy. The present inventor's Strategic Technology Architecture Roadmap (STAR) helps focus on the architecture piece—e.g., the framework upon which all e-business systems will be built.

Broad Scope of the Invention:

While illustrative embodiments of the invention have been described herein, it will be appreciated that the present invention is not limited to the various embodiments described herein, but includes any and all embodiments having modifications, omissions, combinations (e.g., of aspects across various embodiments), adaptations and/or alterations as would be appreciated by those in the art based on the present disclosure. The appended claims are to be interpreted broadly based the language employed in the claims and not improperly limited to illustrative examples described in the present specification or in the prosecution of the application. As merely one example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts are not recited in support of that function.

What is claimed is:

1. A computer system having aligned architectures and infrastructure for e-commerce technologies of an enterprise, comprising:
   a) an upper infrastructure layer having a service-driven architecture,
      with a virtual application layer having a distributed component architecture, and
      with an application infrastructure layer having an n-tiered architecture, wherein the system provides parallel execution of application code in all n-tiers of the n-tier architecture of said application infrastructure layer; and
   b) a lower infrastructure layer having a network-centric architecture,
      with a compute server infrastructure layer having an adaptive compute architecture, and
      with a data storage infrastructure layer having a storage network architecture,
   wherein the lower infrastructure layer includes substantially all of the system hardware infrastructure to run the upper service layer;
   wherein the upper infrastructure layer includes substantially all of the application software; and
   wherein substantially all compute resources are isolated at said compute server infrastructure layer, including all processors and memory that executes code.

2. The system of claim 1, wherein said distributed component architecture facilitates tiering in the n-tier architecture and tiering exploits a shared services model in said service-driven architecture.

3. The system of claim 1, wherein said upper infrastructure layer is adapted for component, application and service distribution and said lower infrastructure layer is adapted for centralization within a network.

4. The system of claim 1, wherein a logical and physical layering between consumption of processing power and memory in the server infrastructure layer and storage in the storage infrastructure layer provides for flexible and adaptive infrastructure.

5. The system of claim 1, wherein the lower infrastructure layer contains processing, storage and network hardware.

6. The system of claim 1, wherein the application infrastructure layer includes substantially all of the basic services that form an application platform.

7. The system of claim 1, wherein the virtual application layer includes presentation logic and data access logic, introducing a virtual layer between application components and basic services.

8. The system of claim 1, wherein applications are substantially independent from the application infrastructure layer.

9. The system of claim 8, wherein said applications are dependent substantially only on virtual application layer APIs.

10. The system of claim 1, wherein in the upper infrastructure layer, services of the service-driven architecture are based on said distributed component architecture, which also enables layering into multiple tiers.

11. The system of claim 1, wherein said distributed component architecture of said virtual application layer, along with said component architecture, provide compatibility and manageability.

12. The system of claim 1, wherein said system is configured such that component changes are accomplished at the virtual application layer with minimal impact on the application infrastructure layer.

13. The system of claim 1, wherein components of said component architecture communicate with each other via standards-based protocols.

14. The system of claim 1, wherein said n-tier architecture of said application infrastructure layer addresses scalability by tiering an application's logic between application infrastructure services.

15. The system of claim 14, wherein most of the presentation logic is handled by Web servers or portal servers, business logic is executed at an application server, common application data is accessed from directory servers, and transaction data is manipulated from database servers.

16. The system of claim 1, wherein the system provides levels of security between tiers of said n-tiers.

17. The system of claim 1, wherein said n-tiers include a client tier, a presentation tier, a business tier, an integration tier and a resource tier.

18. The system of claim 1, wherein said upper application layer includes business services in the virtual application layer, basic services in the application infrastructure layer, and both management services in the virtual application layer and the application infrastructure layer.

19. The system of claim 18, wherein said management services are for managing and monitoring at least some of the applications in the virtual application infrastructure services.

20. The system of claim 18, wherein said basic infrastructure services include application infrastructure services, including directory services, file transfer services, Web services, e-mail services or database services.

21. The system of claim 18, wherein said business services are built on application infrastructure services to perform business service activities.

22. The system of claim 18, wherein said portal services include services that are aggregated for specific groups of end users.

23. The system of claim 1, wherein basic services are built on standards including at least one from the group consisting of HTTP, HTTPS, IMAP, POP, SMTP, LDAP, FTP and XML.

24. The system of claim 1, wherein said lower infrastructure layer includes hardware components, including routers, servers, and storage.

25. The system of claim 24, wherein substantially all logic is executed on a server side, leaving an ultra-thin client-side.

26. The system of claim 1, wherein said compute server infrastructure provides dynamic allocation of resources to system domains.

27. The system of claim 1, wherein said storage infrastructure layer holds substantially all data and offers a shared storage model.

28. The system of claim 27, wherein an adaptive server architecture fits with said shared storage model with said shared storage enabling dynamic system domain technology to work across all nodes in a network.

29. The system of claim 1, wherein said distributed component architecture of said virtual application layer allows for scalability within and outside of a compute server box and increased availability due to redundant distribution of application components.

30. A method for modeling an e-commerce computing environment, comprising:
   modeling a virtual application layer for the e-commerce computing environment using a distributed component architecture;
   modeling an application infrastructure layer for the e-commerce computing environment using an n-tier architecture;
   modeling an upper infrastructure layer for the e-commerce computing environment using a service-driven architecture;
   modeling a lower infrastructure layer for the e-commerce computing environment using a network-centric architecture;
   modeling a compute infrastructure layer for the e-commerce computing environment using an adaptive compute architecture; and
   modeling a storage infrastructure layer for the e-commerce computing environment using a storage network architecture;
   wherein the lower infrastructure layer, the compute infrastructure layer, and the storage infrastructure layer are modeled as part of a lower layer in an architecture for the e-commerce computing environment and the virtual application layer, the application infrastructure layer, and the upper infrastructure layer are modeled as part of an upper layer in the architecture for the e-commerce computing environment, with the lower and upper layers being integrated in a single model for the e-commerce computing environment.

* * * * *